US011182789B2

(12) United States Patent
Vesely (10) Patent No.: US 11,182,789 B2
(45) Date of Patent: Nov. 23, 2021

(54) SECURING PERSONAL IDENTIFICATION NUMBER (PIN) ENTRY ON A TRANSACTION TERMINAL

(71) Applicant: NCR Corporation, Atlanta, GA (US)

(72) Inventor: Jan Vesely, Monifieth (GB)

(73) Assignee: NCR Corporation, Atlanta, GA (US)

( * ) Notice: Subject to any disclaimer, the term of this patent is extended or adjusted under 35 U.S.C. 154(b) by 343 days.

(21) Appl. No.: 16/221,467

(22) Filed: Dec. 15, 2018

(65) Prior Publication Data
US 2020/0193439 A1 Jun. 18, 2020

(51) Int. Cl.
*G06Q 20/40* (2012.01)
*G06F 21/57* (2013.01)
*G06Q 20/20* (2012.01)
*G06Q 20/38* (2012.01)

(52) U.S. Cl.
CPC ......... *G06Q 20/4012* (2013.01); *G06F 21/57* (2013.01); *G06Q 20/20* (2013.01); *G06Q 20/3821* (2013.01)

(58) Field of Classification Search
CPC ............... G06Q 20/4012; G06Q 20/20; G06Q 20/3821; G06F 21/57

USPC .......................................................... 705/72
See application file for complete search history.

(56) References Cited

U.S. PATENT DOCUMENTS 9,235,967 B1 * 1/2016 Magee ............... G06Q 20/1085

* cited by examiner

*Primary Examiner* — James D Nigh
(74) *Attorney, Agent, or Firm* — Schwegman, Lundberg & Woessner (57) ABSTRACT

A Personal Identification Number (PIN) pad includes a secure processor and is operated in two modes: 1) a secure mode during which key data associated with depressed keys are encrypted by the secure processor and provided to a transaction manager that executes on a processor of a transaction terminal in encrypted format, and 2) a non-secure mode during which key data associated with depressed keys are not encrypted and are received by the transaction manager in a clear format. The transaction manager activates the secure mode based on transaction processing for a transaction at the terminal. When secure mode is activated, the secure processor causes one or more integrated lights/speakers of the PIN pad and/or of other integrated peripherals of the terminal to illuminate or play a sound, providing an indication to a user that key entry is secure and safe for entry on the PIN pad during the transaction.

18 Claims, 4 Drawing Sheets

SECURING PERSONAL IDENTIFICATION NUMBER (PIN) ENTRY ON A TRANSACTION TERMINAL

BACKGROUND

Many types of Self-Service Terminals (SSTs) include secure input devices referred to as encrypted PIN pads. The encrypted PIN pad has two modes of operation, the first is a non-secure mode during which keys pressed on the key pad are visible to the software that processes on the transaction terminal. Here, the input is capable of being compromised by malicious spyware that may infect the transaction terminal environment. The second mode of operation is a secure mode during which a processor on the encrypted PIN pad takes control of the keys pressed and encrypts the keys entered, the keys pressed are not displayed on the display (except to indicate a selection was made (usually with an asterisk symbol "*")). The encrypted key entry is then sent by the encrypted PIN pad processor back to the processing application on the transaction terminal, such that the software executing on the transaction terminal can alone see encrypted data and cannot decrypt such data.

The problem with the above-referenced situation is that many transaction interfaces are now web-based software that processes within a browser of the transaction terminal. This allows for changes to the transaction interfaces to be easily managed remotely by changing the transaction flows and/or transaction pages associated with the transaction interfaces. But, the technique also presents a problem, in that malicious code can fake activation of the encrypted PIN pad during PIN entry within the browser and fake asterisks on the display for the entry, such that when the user is entering a PIN for a transaction, the encrypted PIN pad is not in the secure mode of operation and the PIN entered is exposed to any malicious spyware that may infect the transaction terminal environment.

Current users/customers of the transaction terminal are generally unaware of the security hole and even if they are aware, they have no ability to tell whether their entered PIN is being stolen by malicious code or whether their entered PIN is securely handled during the transactions on the transaction terminal.

SUMMARY

In various embodiments, methods and a transaction terminal for securing PIN entry are presented.

According to an embodiment, a method for securing PIN entry on a transaction terminal is presented. Responsive to transaction processing of a transaction, a keypad is placed into a secure mode of operation during which pressed keys of the keypad are encrypted by a secure processor of the keypad. The secure processor causes one or more visual or audio effects that provide an indication to the customer for safe entry of any user-pressed keys on the keypad during the secure mode of operation.

DETAILED DESCRIPTION

Figure 1:
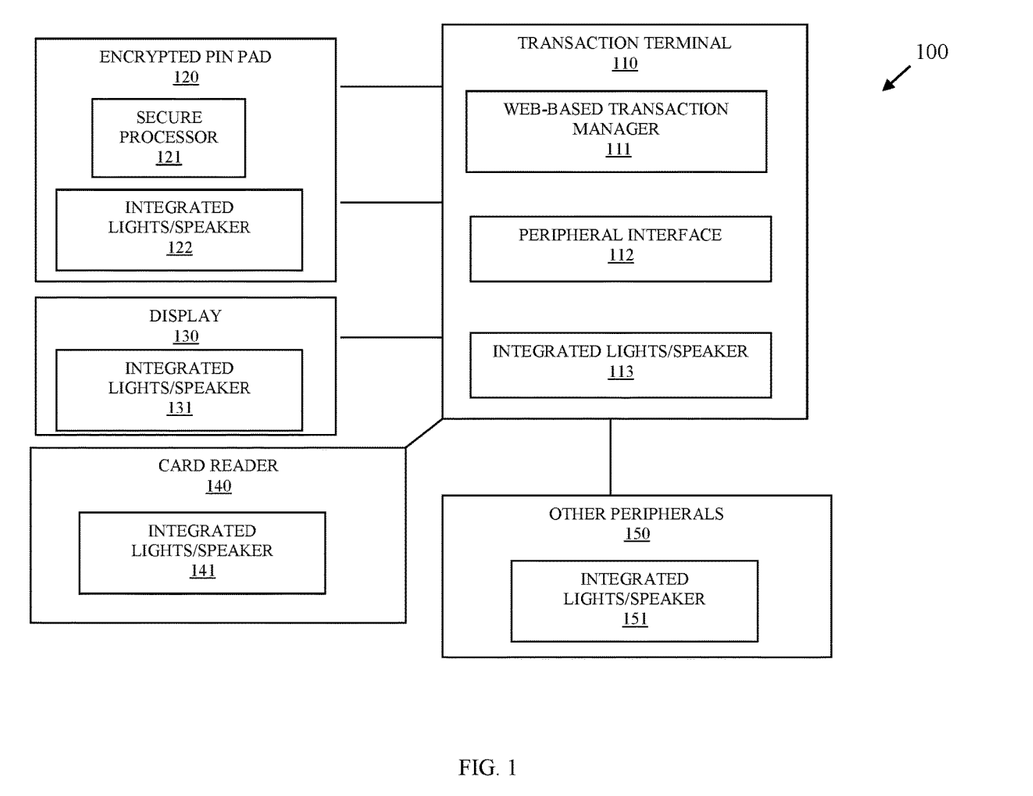
FIG. 1 is a diagram of a system for securing PIN entry on a transaction terminal, according to an example embodiment.

FIG. 1 is a diagram of a system 100 for securing PIN entry on a transaction terminal for securing PIN entry on a transaction terminal, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the methods of securing PIN entry on a transaction terminal, presented herein and below.

As used herein and below, the terms "customer," "consumer," and "user" may be used interchangeably and synonymously.

The system 100 includes a transaction terminal 110 having a web-based transaction manager 111 and a peripheral interface 112; an encrypted PIN pad 120 (integrated peripheral of the terminal 110) having a secure processor 121 and, optionally, one or more integrated lights/speaker 122; a display 130 having, optionally, one or more integrated lights/speaker 131, a card reader 140 having, optionally, one or more integrated lights/speaker 141, and, optionally, a variety of other peripherals 150 with or without one or more integrated lights/speaker 151.

The transaction manager 111 and the peripheral interface 112 are provided as executable instructions that reside in a non-transitory computer-readable storage medium and are executed on a hardware processor of the terminal 110. Additionally, the encryption software and light/sound activation software of the encrypted PIN pad 120 are executed by the secure processor 121 as executable instructions that reside in a non-transitory computer-readable medium of the encrypted PIN pad 120. In some cases, the display 130, the card reader 140, and the other peripherals 150 may include their own independent processors and execute executable instructions from non-transitory computer-readable storage-mediums.

During operation of the transaction terminal 110, users/customers perform transactions through a web-based customer-facing interface provided and managed by the transaction manager 111. The transaction manager 111 also accesses the peripheral interfaces, which allows the web-based interface processing with a browser of the transaction terminal 110 to access and interface with peripherals 120, 130, 140, and 150 during the transaction with the user.

The transaction manager 111 uses the peripheral interfaces 112 to instruct the peripherals 120 130, 140, and 150 to process some instruction. The transaction manager 111 can place the encrypted PIN pad 120 in two modes of operation: a standard insecure mode of receiving input from the user via the keypad of the PIN pad 120 and a secure mode of receiving input from a user via the keypad of the PIN pad 120. In secure mode, the PIN pad 120, via secure processor 121, prevents depressed or selected keys from the PIN pad from being provided back to the transaction manager 111 in an unencrypted or decrypted format, such that as keys are selected by the user, the display 130 just displays an indication of a selected key as some character, such as an asterisk. The actual keys selected in secure mode are provided by the secure processor 121 to the transaction manager 111 in an encrypted format that the transaction manager 111 cannot decrypt. The encrypted key data is sent from the transaction manager 111 to a host (such as a financial institution) as a PIN block over a network connection, where the host is capable of decrypting the PIN block and verifying the PIN from the decrypted data. The host then sends a verification back to the transaction manager 111 providing authorization for the transaction to proceed. The authorization may provide further encrypted data that a dispenser (other integrated peripheral 150) can independently verify for purposes of dispensing currency to the user for the transaction.

However, if the web-based interface becomes corrupted, then the PIN pad 120 may be activated in the non-secure mode of operation during a transaction that requires the secure mode of operation of the PIN pad 120. In such cases, and conventionally, the user has no way of detecting or knowing that the user-entered PIN is actually being exposed over the network to a potentially harmful program. The actual entered PIN can be masked by the harmful program, such that the user is completely unaware of the security breach with respect to the transaction and the user's entered PIN.

This situation is corrected with the teachings presented herein. When the transaction dictates entry of a PIN and the secure mode of operation by the PIN pad 120, the secure processor 121 causes instructions that activate the one or more integrated lights/speakers 113, 122, 131, 141, and 151. This integrated lights/speakers 113, 122, 131, 141, and 151 on the housings and facie of the terminal 110 and the integrated peripherals 120, 130, 140, and 150 and are only activated during the secure entry mode of operation of the PIN pad 120. This provides a visual notification to the customer that the terminal 110 is in a secure PIN entry mode, such that the entered PIN required for the transaction can be entered by the customer on the PIN pad 120 without fear of such PIN being compromised over the network through the web-based and browser-based transaction interface.

It is noted that just one, any combination of, or all of the available integrated lights 113, 122, 131, 141, and 151 may be instructed to activate when the PIN pad 120 is in a secure mode of operation. The number of the lights 113, 122, 131, 141, and 151 and the combinations can be customized.

Additionally, any of the terminal 110, the PIN pad 120, the display 130, the card reader 140, and the other peripherals 150 may include integrated speakers 113, 122, 131, 141, and 151 (which are integrated into those devices), and the secure processor 121 may also send a unique audio sound to be played over such speakers 113, 122, 131, 141, and 151. Again, just one speaker 113, 122, 131, 141, or 151 may be activated on the start or initiation of the secure PIN entry mode of operation or some combination (or all) speakers 113, 122, 131, 141, and 151 may be activated to play the customized audio sound.

It is noted that any lighting command may or may not include lighting effects (strobing, blinking) or unique colors (providing such colors are supported by the available lights on the devices).

Both sounds and lights may also be activated in combination with one another by initiation of the secure PIN entry mode on the PIN pad 120.

In an embodiment, the lights/speakers 113, 122, 131, 141, and 151 are part of the hardware devices' housings or facies and are typically controlled exclusively by the firmware of the devices 110, 120, 130, 140, and 150, such that when the PIN pad is placed into a secure PIN entry mode by the transaction manager, a specific information/data (secure mode of PIN entry to the PIN pad 120) will activate the firmware on these devices 110, 120, 130, 140, and 150.

In an embodiment, the secure processor 121 of the PIN pad 120 exclusively controls its integrated light/speaker 122, such that the secure processor 121 is configured to activate the light/speaker 122 when placed into secure mode by the transaction manager 111. In this way, even if a malicious version of the transaction manager replaced the transaction manager 111 during a security breach, such transaction manager would not be able to cause the PIN pad 120 to activate its light/speaker 122 because the malicious version of the transaction manager would not want and would not put the PIN pad 120 into the secure mode of operation because doing so would prevent the malicious version of the transaction manager from discovering an unencrypted PIN entered by a user on the PIN pad 120.

In an embodiment, the secure processor 121 when placed in secure mode of operation by the transaction manager 111, sends an encrypted code back to the transaction manager 111. The transaction manager 111 then broadcasts that code to the display 130, card reader 140, and other peripherals 150. Each of these peripherals 130, 140, and 150 can decrypt the code but the transaction manager 111 cannot. This is similar to the last embodiment, in that a corrupted transaction manager could not force the PIN pad 120 into supplying the encrypted code unless the PIN pad 120 is in a secure mode of operation. The encrypted code can vary and be hashed, such that it is undiscoverable by any corrupted transaction manager.

The transaction manager 111 triggers initiation of the customized lights/speakers 113, 122, 131, 141, and 151 by placing the PIN pad 120 into a secure mode of operation for receiving a PIN from a user during a transaction. But, the secure processor 121 of the PIN pad 120 provides the processing and information when it is placed into secure mode for PIN entry to actually cause the lights/speakers 113, 122, 131, 141, and 151 to activate.

The lights/speakers (playing a unique sound) 113, 122, 131, 141, and 151 may remain activated until the secure processor 121 shuts down the secure mode of operation by deactivation and returning the PIN pad 120 back to a non-secure mode of operation. So, the user knows when the PIN pad 120 is no longer in the secure mode of operation.

The transaction manager 111 determines when and when not to instruct the secure processor 121 to be activated (secure mode) or deactivated (insecure mode). But once in secure mode, it is the secure processor 121 that causes the integrated lights/speakers 113, 122, 131, 141, and 151 to light or play audio sounds. This ensures that should the transaction terminal 110 become corrupted that the secure mode for PIN entry cannot be feigned by any malicious software on the terminal 110 (including by a corrupted transaction manager).

A user now has a visual and audio verification during PIN entry that the PIN pad 120 is in a secure and encrypted mode of operation, such that the PIN entered cannot be compromised over the network or on the terminal 110.

Because many existing transaction terminals utilize web-based interfaces, the processing of the system 100 provides a security solution to provide customers assurances (visual and/or audio based) that their PINs are not being compromised while conducting transactions on the transaction terminal 110. This is driven (initiated) by the transaction manger 111 but exclusively controlled and provided by the PIN pad 120 only when the secure processor 121 is activated by the transaction manager 111 for the secure mode of PIN entry, ensuring that no software resources of the terminal 110 can feign a secure mode of PIN entry.

In an embodiment, the transaction terminal 110 is a SST. In an embodiment, the SST is an Automated Teller Machine (ATM). In an embodiment, the SST is a kiosk.

In an embodiment, the transaction terminal 110 is Point-Of-Sale (POS) terminal operated by a cashier or an attendant to perform transactions on behalf of customers.

In an embodiment, the PIN pad 120 is an encrypted PIN pad that includes at least one integrated light 122 integrated in a facie of a housing of the pin pad that is visible on the physical keys or adjacent to the keys as a visible strip of lights and activated and deactivated by the secure processor 121 (activated for a secure mode of operation and deactivated for a non-secure mode of operation).

In an embodiment, the other integrated peripherals 150 can include some or all of: a printer, a cash/coin dispenser, a cash/check dispenser, a cash/coin accepter, a cash/check acceptor, a Near Field Communication (NFC) reader, a wireless transceiver, etc.

These embodiments and other embodiments are now discussed with reference to the FIGS. 2-4.

Figure 2:
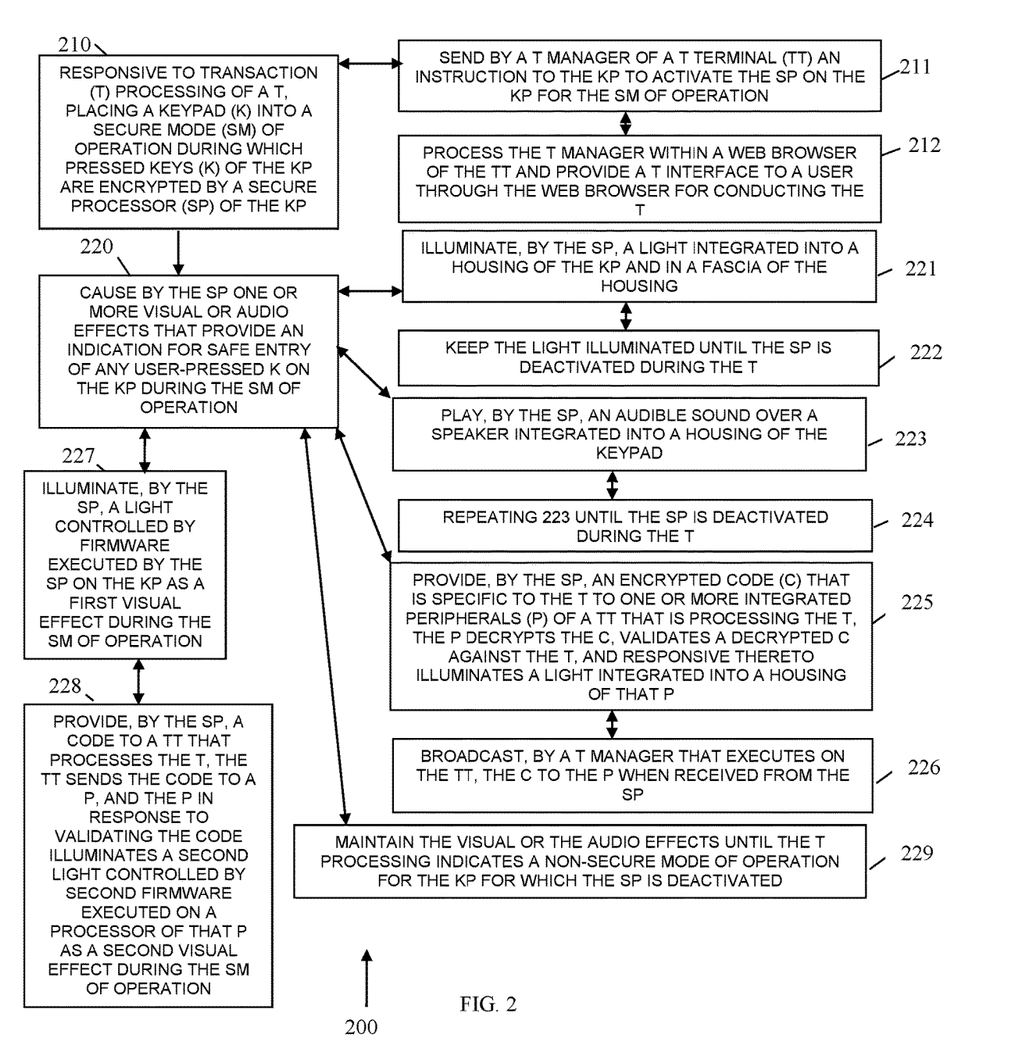
FIG. 2 is a diagram of a method for securing PIN entry on a transaction terminal, according to an example embodiment.

FIG. 2 is a diagram of a method 200 for securing PIN entry on a transaction terminal, according to an example embodiment. The software module(s) that implements the method 200 is referred to as a "secure PIN entry manager." The secure PIN entry manager is implemented as executable instructions programmed and residing within memory and/or a non-transitory computer-readable (processor-readable) storage medium and executed by one or more processors of a device. The processor(s) of the device that executes the secure PIN entry manager are specifically configured and programmed to process the secure PIN entry manager. The device that executes the secure PIN entry manager has access to one or more network connections during its processing. The network connections can be wired, wireless, or a combination of wired and wireless.

In an embodiment, the device that executes the secure PIN entry manager is the transaction terminal 110 and the encrypted PIN pad 120. In an embodiment, the transaction terminal 110 is a SST. In an embodiment, the SST is an Automated Teller Machine (ATM). In an embodiment, the SST is a kiosk. In an embodiment, the transaction terminal 110 is a Point-Of-Sale (POS) terminal operated by a cashier that assists with customer transactions.

In an embodiment, the secure PIN entry manager is a combination of: the transaction manager 111 and the secure processor 121 configured to perform the processing discussed above with the FIG. 1.

At 210, the secure PIN entry manager, responsive to transaction processing (dictated by the process flow) of a transaction being processed, places a keypad into a secure mode of operation during which keys pressed on the keypad are encrypted by a secure processor of the keypad.

In an embodiment, at 211, the secure PIN entry manager sends (through transaction manager 111) an instruction to the keypad to activate the secure processor on the keypad for the secure mode of operation.

In an embodiment of 211 and at 212, the secure PIN entry manager processes the transaction manager 111 within a web browser of the transaction terminal and provides a transaction interface to a user through the web browser for conducting the transaction. That is, the transaction interface is provided through web pages.

At 220, the secure processor of the keypad causes one or more visual and/or audio effects that provide an indication for safe entry of any user-pressed key on the keypad during the secure mode of operation.

In an embodiment, at 221, the secure processor illuminates a light integrated into a housing and fascia of the housing for the keypad. The light controlled exclusively by the secure processor and is part of the keypad.

In an embodiment of 221 and at 222, the secure processor keeps the light illuminated until the secure processor is deactivated (indicating that the transaction has transitioned to a non-secure mode of operation).

In an embodiment at 223, the secure processor plays an audible sound over a speaker that is integrated into a housing and fascia of the keypad. Again, the speaker is exclusively controlled by firmware of the keypad that only the secure processor executes, such that no software can initiate the speaker and play a sound without the secure processor being activated and the keypad being in a secure mode of operation.

In an embodiment of 223 and at 224, the secure processor repeatedly plays the audible sound over the speaker until the secure processor is deactivated during the transaction (again an indication that the transaction has transitioned to a non-secure mode of operation).

In an embodiment, at 225, the secure processor provides an encrypted code that is specific to the transaction (e.g., hashed based on a transaction identifier for the transaction) to one or more other integrated peripherals of the transaction terminal. The transaction terminal processes the transaction through the transaction manager 111. Once received by the peripherals, the peripherals decrypt the encrypted code, validate the decrypted code against the transaction and responsive thereto illuminates lights that are integrated into housings of those peripherals and that are exclusively controlled by those peripherals.

In an embodiment of 225 and at 226, the transaction manager 111, upon receipt of the encrypted code from the secure processor at 225, broadcasts the encrypted code to the peripherals. In an embodiment, the transaction manager 111 is unable to decrypt the encrypted code provided by the secure processor and merely forwards it along to the other integrated peripherals.

In an embodiment, at 227, the secure processor illuminates a light that is controlled by firmware executed by the secure processor on the keypad as a first visual effect during the second mode of operation (while the secure processor is activated on the keypad).

In an embodiment of 227 and at 228, the secure processor also provides a code to the transaction terminal (through the transaction manager 111). The transaction manager then sends the code to a peripheral. The peripheral validates the code and illuminates a second light controlled by second firmware executed on a processor of that peripheral as a second visual effect during the secure mode of operation for the transaction (being processed on the transaction terminal).

Figure 3:
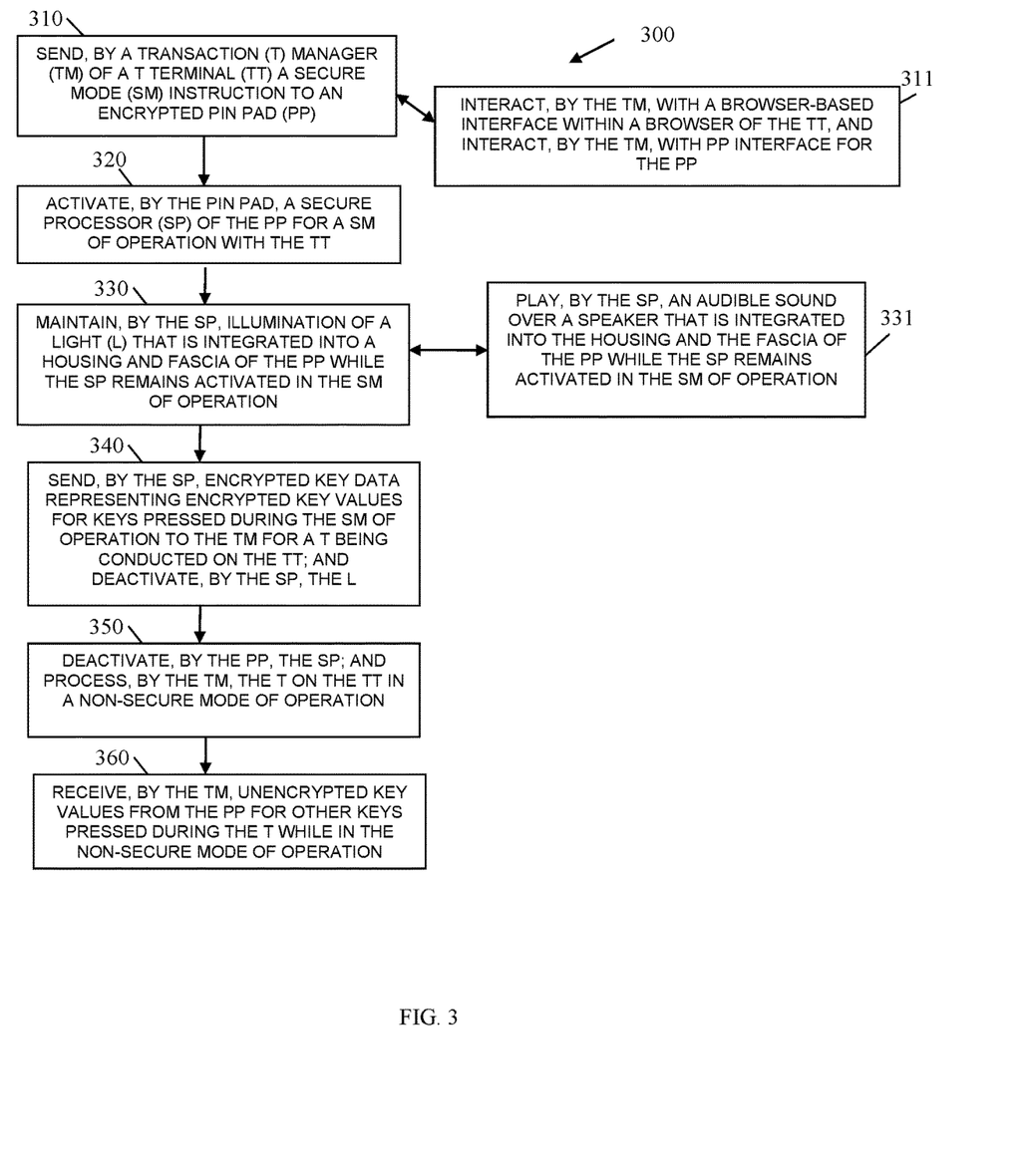
FIG. 3 is a diagram of another method for securing PIN entry on a transaction terminal, according to an example embodiment.

FIG. 3 is a diagram of another method 300 for securing PIN entry on a transaction terminal, according to an example embodiment. The software module(s) that implements the method 300 is referred to as a "secure key entry notifier." The secure key entry notifier is implemented as executable instructions programmed and residing within memory and/or a non-transitory computer-readable (processor-readable) storage medium and executed by one or more processors of a device. The processors that execute the secure key entry notifier are specifically configured and programmed to process the secure key entry notifier. The device that executes the secure key entry notifier has access to one or more network connections during its processing. The network connections can be wired, wireless, or a combination of wired and wireless.

In an embodiment, the device that executes the secure key entry notifier is the transaction terminal 110 and the encrypted PIN pad 120. In an embodiment, the transaction terminal 110 is a SST. In an embodiment, the SST is an ATM. In an embodiment, the SST is a kiosk. In an embodiment, the device that executes the secure key entry notifier is a POS terminal In an embodiment, the secure key entry notifier is a combination of: the transaction manager 111 and the secure processor 121 configured to perform the processing discussed above with the FIG. 1; and/or secure key entry notifier is the method 200 discussed with the FIG. 2 above.

The secure key entry notifier represents another and in some ways enhanced processing perspective from that which was described with the method 200 of the FIG. 2.

At 310, the secure key entry notifier sends (through transaction manager 111) a secure mode instruction to an encrypted PIN pad.

In an embodiment, at 311, the transaction manager 111 interacts with a browser-based interface within a browser of the transaction terminal, and the transaction manager interacts with a peripheral interface for the encrypted PIN pad.

At 320, the PIN pad activates a secure processor of the PIN pad for a secure mode of operation with the transaction manager 111 of the transaction terminal. This is done responsive to the instruction sent at 310 by the transaction manager 111.

At 330, the secure processor maintains illumination of a light that is integrated into a housing and fascia of the PIN pad while and as long as the secure processor remains activated in the secure mode of operation.

In an embodiment, at 331, the secure processor plays an audible sound over a speaker that is integrated into the housing and the fascia of the PIN pad while and as long as the secure processor remains activated in the secure mode of operation.

In an embodiment, at 340, the secure processor sends encrypted key data representing encrypted key value for keys pressed on the keypad during the secure mode of operation to the transaction manager 111 for a transaction being conducted on the transaction terminal. The secure processor after sending the encrypted key data deactivates or turns off the light.

In an embodiment of 240 and at 350, the encrypted PIN pad deactivates or shuts down the secure processor. Next, the transaction manager 111 continues processing the transaction on the transaction terminal in a non-secure mode of operation.

In an embodiment of 350 and at 360, the transaction manager 111 receives unencrypted key value from the encrypted PIN pad for other keys pressed by a user during the transaction while in the non-secure mode of operation.

The embodiments of 350 and 360 illustrate that the encrypted PIN pad can provide a secure and insecure (non-secure) mode of operation for the transaction. In a secure mode, the transaction manager 111 is unable to obtain key values for keys pressed on the keypad. In a non-secure mode, the transaction manager 111 can see and knows the key values for keys pressed on the keypad. However, during the secure mode the secure processor controls and illuminates the light, which is physically part of the encrypted PIN pad. This provides visual cues to the user conducting the transaction that entry of key data by pressing keys on the keypad is secure while the light is illuminated on the keypad.

Figure 4:
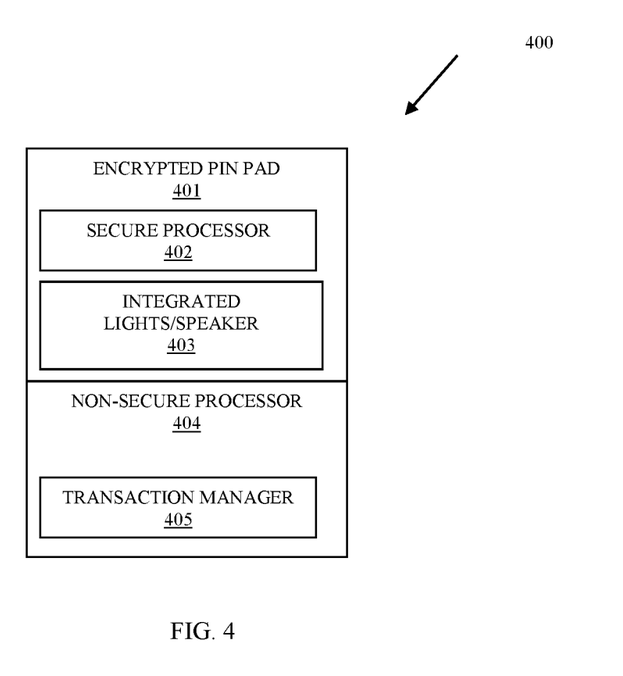
FIG. 4 is a diagram of a transaction terminal for securing PIN entry, according to an example embodiment.

FIG. 4 is a diagram of a transaction terminal 400 for person securing PIN entry on a transaction terminal, according to an example embodiment. The terminal 400 includes a variety of hardware components and software components. The software components of the terminal 400 are programmed and reside within memory and/or a non-transitory computer-readable medium and execute on one or more processors of the terminal 400. The terminal 400 communicates over one or more networks, which can be wired, wireless, or a combination of wired and wireless.

In an embodiment, the terminal 400 implements, inter alia, the processing described above with the FIGS. 1-3.

The transaction terminal 400 includes an integrated peripheral encrypted PIN pad 401 having its own independent and secure processor 402 and at least one integrated light/speaker 403 that is integrated into a housing and fascia of the encrypted PIN pad 401. The transaction terminal 400 also includes a non-secure processor or application processor 404 that executes executable instructions representing a transaction manager 405.

In an embodiment, the transaction terminal 400 is a SST. In an embodiment, the SST is an ATM. In an embodiment, the SST is a kiosk.

In an embodiment, the transaction terminal is a POS terminal.

In an embodiment, the encrypted PIN pad 401 is the encrypted PIN pad 120.

The transaction terminal 400 includes the encrypted PIN pad 401 as an integrated peripheral having its own processing, memory, and storage resources and connected through a port interface within the housing of the transaction terminal 400 to the non-secure processor 404.

The transaction terminal also includes a variety of other integrated peripherals including any combination of all of 130 (display), 140 (card reader) and other 150 (other integrated peripherals) such as: a printer, a cash/coin dispenser, a cash/check dispenser, a cash/coin accepter, a cash/check acceptor, a Near Field Communication (NFC) reader, a wireless transceiver, etc.

In an embodiment, the encrypted PIN pad 401 is the pin pad 120.

The encrypted PIN pad 401 includes a housing that encloses the secure processor 402. The encrypted PIN pad 401 also includes press-able keys that are outwardly extended through the housing. The housing also includes at least one integrated light/speaker 403. The encrypted PIN pad 401 is integrated into the transaction terminal 400 as an integrated peripheral (attached via USB or other communication bus to the terminal 400). A slot in the fascia of the main housing of the terminal 400 receives the PIN pad 401 as a keyboard for the terminal 400. The encrypted PIN pad 401 operates in two modes: a secure mode of operation during which the secure processor 402 is activated and the integrated light/speaker 405 is activated by the secure processor 405 and a non-secure mode of operation during which the secure processor 402 is deactivated and the transaction manager 405 executing on the separate non-secure processor 404 receives unencrypted key data from pressed keys on the PIN pad 401.

The transaction manager 405 when executed on the non-secure processor 404 and during the processing of a transaction performs processing to: activate the secure processor 401 during a transaction on the transaction terminal; process the transaction; and deactivate the secure processor 402.

The secure process 401 is configured to: illuminate the at least one light 403, encrypt key values for keys pressed as encrypted key data, provide the encrypted key data to the transaction manager 405 as a portion of transaction input for the transaction, turn of the at least one light 403 after the encrypted key data is provided to the transaction manager 405.

When the transaction is being processed by the transaction manager 405 in a non-secure mode of operation, the secure processor 402 is not activated and the encrypted PIN pad 401 returns unencrypted key values for keys being pressed on the keypad of the encrypted PIN pad 401.

One now appreciates how software resources (such as the transaction manager 405) that execute on a non-secure processor 404 of a transaction terminal 400 can initiate a secure mode of operation on an integrated encrypted PIN pad 401 but cannot control and cannot change operations and actions taken by the secure processor 402 of the encrypted PIN pad 401. Such that, an integrated light 403 that is controlled by firmware executed by the secure processor 402 can illuminate the light 403 during the secure mode of operation. This provides a user conducting a transaction on the terminal 400 with assurances that any keys pressed for a PIN during the secure mode of operation by the user cannot be compromised by a corrupted transaction manager or any other malicious or spyware software that may be executing on the non-secure processor 404 of the terminal 400.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   responsive to transaction processing of a transaction, placing a keypad into a secure mode of operation during which pressed keys of the keypad are encrypted by a secure processor of the keypad; and
   causing by the secure processor one or more visual or audio effects that provide an indication for safe entry of any user-pressed keys on the keypad during the secure mode of operation, wherein causing further includes:
      providing, the secure processor, an encrypted code that is specific to the transaction to one or more integrated peripheral devices of a transaction terminal that is processing the transaction, at least one integrated peripheral decrypts the encrypted code, validates a decrypted code against the transaction, and responsive thereto illuminates a light integrated into a housing and fascia of that integrated peripheral.

2. The method of claim 1, wherein placing further includes sending, by executable instructions that execute from a non-transitory computer-readable medium on a second processor of a transaction terminal, an instruction to the keypad to activate the secure processor on the keypad for the secure mode of operation.

3. The method of claim 1 further comprising, processing the executable instructions within a web browser of the transaction terminal and providing a transaction interface to a user through the web browser for conducting the transaction.

4. The method of claim 1, wherein causing further includes illuminating, by the secure processor of the keypad, a light integrated into a housing of the keypad and in a fascia of the housing.

5. The method of claim 4, wherein illuminating further includes keeping the light illuminated until the secure processor is deactivated during the transaction.

6. The method of claim 1, wherein causing further includes, playing, by the secure processor of the keypad, an audible sound over a speaker integrated into a housing of the keypad.

7. The method of claim 6, wherein playing further includes repeating the playing for the audible sound over the speaker until the secure processor is deactivated during the transaction.

8. The method of claim 1, wherein providing further include broadcasting, by executable instructions that execute on a processor of the transaction terminal from a non-transitory medium, the encrypted code to the one or more integrated peripherals when received from the secure processor.

9. The method of claim 1, wherein causing further includes illuminating, by the secure processor, a light controlled by firmware executed by the secure processor on the keypad as a first visual effect during the secure mode of operation.

10. A method, comprising:
    responsive to transaction processing of a transaction, placing a keypad into a secure mode of operation during which pressed keys of the keypad are encrypted by a secure processor of the keypad; and
    causing by the secure processor one or more visual or audio effects that provide an indication for safe entry of any user-pressed keys on the keypad during the secure mode of operation, wherein causing further includes:
       providing, by the secure processor, a code to a transaction terminal that processes the transaction, wherein the transaction terminal sends the code to an integrated peripheral and the integrated peripheral in response to validating the code illuminates a second light controlled by firmware executed on a processor of that integrated peripheral as a second visual effect during the secure mode of operation.

11. The method of claim 10, wherein causing further includes maintaining the visual or the audio effects until the transaction processing indicates a non-secure mode of operation for the keypad for which the secure processor is deactivated.

12. A method, comprising:
sending, by a first set of executable instructions that execute on a first processor from a non-transitory computer-readable storage medium of a transaction terminal, a secure mode instruction to an encrypted Personal Identification Number (PIN) pad;
activating, by the PIN pad, a secure processor on the encrypted PIN pad for a secure mode of operation with the transaction terminal;
maintaining, by the secure processor, illumination of a light that is integrated into a housing and fascia of the encrypted PIN pad while the secure processor remains activated in the secure mode of operation; and
playing, by the secure processor, an audible sound over a speaker that is integrated into the housing and the fascia of the encrypted PIN pad while the secure processor remains activated in the secure mode of operation.

13. The method of claim 12 further comprising:
sending, by the secure processor, encrypted key data representing encrypted key values for keys pressed during the secure mode of operation to the executable instructions for a transaction being conducted on the transaction terminal; and
deactivating, by the secure processor, the light.

14. The method of claim 13 further comprising:
deactivating, by the encrypted PIN pad the secure processor; and
processing, by the executable instructions, the transaction on the transaction terminal in a non-secure mode of operation.

15. The method of claim 14 further comprising, receiving, by the executable instructions unencrypted key values from the encrypted PIN pad for other keys pressed during the transaction during the non-secure mode of operation.

16. The method of claim 12, wherein sending further includes interacting, by the executable instructions, with a browser-based interface being executed on first processor within a browser and interacting, by the executable instructions with an encrypted PIN pad peripheral interface for the encrypted PIN pad.

17. A transaction terminal, comprising:
an encrypted Personal Identification Number (PIN) pad that includes a secure processor;
a non-secure processor configured to execute executable instructions from a non-transitory computer-readable storage medium;
at least one light integrated into a housing and fascia of the encrypted PIN pad and controlled by the secure processor;
the executable instructions when executed by the non-secure processor configured to perform processing to:
activate the secure processor for a secure mode of operation during a transaction on the transaction terminal;
process the transaction; and
deactivate the secure processor for the secure mode of operation; and
the secure processor when activated by the executable instructions for the secure mode of operation configured to:
maintain illumination of the at least one light while the secure processor remains activated in the secure mode of operation;
encrypt key values for keys pressed as encrypted key data;
provide the encrypted key data to the executable instructions as a portion of transaction input for the transaction;
play an audible sound over a speaker that is integrated into the housing and the fascia of the encrypted PIN pad while the secure processor remains activated in the secure mode of operation; and
turn off the at least one light after the encrypted key data is provided to the executable instructions.

18. The system of claim 17, wherein the transaction terminal is one of: a Self-Service Terminal (SST), an Automated Teller Machine (ATM), a kiosk, and a Point-Of-Sale (POS) terminal.

* * * * *